United States Patent Office 2,775,570
Patented Dec. 25, 1956

2,775,570
SOLUTIONS OF FORMALDEHYDE POLYMERS

Archie E. Barkdoll, Hockessin, Wilmington, and Robert N. MacDonald, Wilmington, Del., assignors to E. I. du Pont de Nemours and Company, Wilmington, Del., a corporation of Delaware No Drawing. Application August 30, 1952,
Serial No. 307,364

5 Claims. (Cl. 260—33.4)

This invention relates to new compositions of matter and to methods for obtaining the same.

The polyoxymethylenes are thermoplastic polymers and can be formed into many useful objects without the use of solvents, e. g., by spinning, extruding or otherwise shaping from molten polymer. This method has certain disadvantages and limitations, especially where it is desired to apply the polyoxymethylene to a substrate which is easily charred or where application to intricate shapes is desired. In these uses, solutions have marked advantages but no solvent has hitherto been known which did not bring about extensive degradation of the polyoxymethylene.

It is an object of this invention to provide solutions of high molecular weight polyoxymethylenes or formaldehyde polymers by utilizing phenols and aralkanols as active solvents. Such solutions can be conveniently made by agitating the formaldehyde polymer with the solvent at 75°–160° C.

The advantages of such solutions are many; e. g., inherent viscosities can be accurately measured, casting of films, and spinning of fibers can be accomplished from a solution, and many other applications can be devised which are more easily accomplished by utilizing solutions.

The examples which follow are submitted to illustrate and not to limit this invention. Unless otherwise specified, parts are by weight. Inherent viscosities were determined at 0.5% concentration in p-chlorophenol containing 2% alpha-pinene at 60° C., unless otherwise noted.

*Example I.*—Two grams of polyoxymethylene (inherent viscosity 1.68) was added to 10.4 grams of p-chlorophenol and the mixture was stirred for 5 to 10 minutes while being heated in a boiling water-bath. A viscous, clear, solution was obtained from which a transparent, tough, film was obtained by spreading the solution on a substrate and removing the solvent at 100° C. and 1 mm. absolute pressure.

*Example II.*—One gram of a polyoxymethylene (inherent viscosity 0.96) was added to 19.6 grams of p-chlorophenol and the mixture heated and stirred at 85° C. for 5 minutes, at the end of which time solution was complete. The solution was then permitted to cool, and the polymer which separated was removed by filtration, washed with ether, and then dried at room temperature overnight. There was obtained 0.86 gram of polymer having an inherent viscosity of 1.04.

The above experiment was repeated using as the solvent a mixture of 19.6 grams of p-chlorophenol and 0.26 gram of alpha-pinene. Precipitation from this solution effected an 82% recovery of polymer which had an inherent viscosity of 1.07 and re-precipitation effected a 94% recovery from the same solvent mixture and caused no substantial change in the inherent viscosity of the polymer. This indicates that in this solvent mixture the polymer undergoes essentially no degradation in the process of solution and precipitation.

A solution of one gram of polyoxymethylene (inherent viscosity 0.96) in 19.6 grams of benzyl alcohol was prepared by heating the mixture with agitation for 5 minutes at 135° C. Precipitation effected a 95% recovery of the polymer which had an inherent viscosity of 1.00.

*Example III.*—A 0.5% solution of a polyoxymethylene (inherent viscosity 1.68 in p-chlorophenol/2% alpha-pinene) in m-chlorophenol was prepared by agitating the ingredients at 85° C. for a short period of time. In m-chlorophenol, the polymer exhibited an inherent viscosity of 1.69.

The above experiment was repeated using as the solvent m-chlorophenol containing 2% of alpha-pinene. The polymer exhibited an inherent viscosity of 1.81 in this medium.

*Example IV.*—A one-to-one mixture of m-chlorophenol and p-chlorophenol was used to dissolve a sample of a polyoxymethylene (inherent viscosity of 1.68) at 80–90° C. to give a viscous solution. The solution gelled upon standing overnight at room temperature.

*Example V.*—Table I lists solvents for polyoxymethylene tested at 2% concentration. The solution temperature is that temperature required to dissolve the polymer in a short time, that is, a time period in the order of 5–10 minutes. The gel temperature is that at which gelation occurs and is determined by visual observation of the solution as it cools.

Table I

| Solvent | Solution Temperature | Gel Temperature |
|---|---|---|
| m-Chlorophenol | 85 | 35 |
| p-Chlorophenol | 85 | 50 |
| o-Chlorophenol | 85 | 70 |
| p-tertiary butylcatechol | 110 | 70 |
| Phenol | 110 | 75 |
| "Fomal" (trichlorophenol/phenol 7/10) | 100 | 80 |
| m-Cresol | 110 | 83 |
| Resorcinol monomethyl ether | 125 | 85 |
| 2-bromo-4-tertiary-butylphenol | 110 | 90 |
| alpha-Methylallylphenol | 110 | 90 |
| o-(alpha-phenylethyl) Phenol | 110 | 90 |
| 2,6-dichlorophenol | 96 | 96 |
| o-Cyclohexylphenol | 110 | 97 |
| alpha-Naphthol | 120 | 96 |
| p-tertiary-butylphenol | 110 | 99 |
| o-Hydroxybenzyl alcohol | 120 | 100 |
| Benzyl alcohol | 130 | 110 |
| o-Hydroxyacetophenone | 125 | 114 |
| Phenyl methylcarbinol | 130 | 120 |
| Methyl-p-hydroxybenzoate | 131 | 130 |
| p-Hydroxybenzophenone | 135 | 134 |

For best results the solutions of this invention are made by agitating the polyoxymethylene and solvent mixture at temperatures in the range of 75° to 160° C. With special solvent combinations, temperatures lower than 75° C. may be used.

The particular temperature conditions selected for effecting solution depend upon the nature of the solvent employed. If the solvent is one which is normally solid, then it is necessary to employ temperatures at which it is liquid. The employment of temperatures above 160° C. is not recommended because no practical advantages accrue therefrom.

Good agitation is essential in effecting rapid and complete dissolution of the polyoxymethylene. This condition is best obtained with the aid of mechanical stirrers, tumblings, and the like.

In the preparation of the solutions of this invention, there can be used the macromolecular polyoxymethylenes having inherent viscosities above 0.6, as illustrated in Table II, below:

Table II

| Source of Polyoxymethylene | Concentration in p-Chlorophenol/ 2%Pinene | Time and Temperature to Dissolve | Inherent Viscosity measured at 60° C. |
|---|---|---|---|
| Ether solution of HCHO initiated with butylamine at −71° C. | 0.5 | ½ hr./85° C. | 2.31 |
| Spontaneous bulk polymerization of HCHO below −80° C. | 0.1 | ½ hr./95° C. | 10.57 |
| HCHO monomer polymerized at −50° C. spontaneously in decahydronaphthalene without added initiator or dispersant (bulk polymerization). | 0.2 | 1½ hr./85° C. | 5.72 |
| Dispersion polymerization of HCHO in decahydronaphthalene containing polyethylene glycol dioleate at −30° C. | 0.5 | 1 hr./85° C. | 2.11 |

A suitable method for preparing polyoxymethylene is described in copending application, Serial No. 365,235, filed by R. N. MacDonald on June 30, 1953, wherein a cold filtered solution of anhydrous monomeric formaldehyde in an inert organic solvent is placed in a reactor which has been purged of oxygen by sweeping with an inert gas, provided with a thermometer, agitator and means for adding the catalyst. The reactor is immersed in a refrigerating bath and when the temperature of the reaction mixtures is between −20° and −120° C. the catalyst, dissolved in a solvent which is preferably identical with the solvent in which the formaldehyde is dissolved, is added at such a rate that the temperature is maintained within the range selected for operation. A convenient and preferred range is −30° to −105° C. because the course of the polymerization is more readily controlled than at higher temperatures. When the polymerization is complete, usually within one to two hours, the reaction mixture is filtered and the polymer dried, suitably at ordinary temperatures.

A typical preparation is the following:

A solution of monomeric formaldehyde, obtained by pyrolyzing 100 grams of alpha-polyoxymethylene, and 800 ml. of dimethyl ether was stirred at −101° to −105° C., as 0.02 mole percent of triphenylphosphine dissolved in 40 ml. of diethyl ether was added gradually over a period of 30 minutes. After the system had been stirred for an additional 70 minutes, the slurry which separated was filtered, and the product on the filter was washed with two-650 ml. portions of diethyl ether, the first portion having been previously cooled in a Dry Ice/acetone bath and the second being at room temperature. The washed product was air-dried and then further dried under vacuum. There was obtained 60 grams of a snow-white, granular polymeric formaldehyde.

Another method for preparing polyoxymethylene is described in copending application, Serial No. 365,234, filed by R. N. MacDonald on June 30, 1953, wherein monomeric formaldehyde is dissolved in a substance which may be a solvent for the monomer but which is a non-solvent for the polymer, the solution is maintained at 0° to −120° C. until 1 to 20% of the formaldehyde polymerizes, the polymer which separates is removed by filtration, and the polymerization of the formaldehyde in the solution is then continued at −20° to −120° C. in the presence of added ionic polymerization catalysts such as aliphatic amines, forming polyoxymethylene which may be separated from the reaction medium and dried to produce a white, granular polymeric product.

Still another method for preparing polyoxymethylene is described in copending application Serial No. 408,172, filed by R. N. MacDonald on February 4, 1954, wherein monomeric formaldehyde is passed into an agitated organic medium which is a non-solvent for the monomer and for the polymer. The polymer which forms may be separated from the dispersion medium by filtration, centrifuging, or other means known to those skilled in the art. A typical preparation is the following:

Monomeric formaldehyde from the pyrolysis of 69 parts of alpha-polyoxymethylene is swept at atmospheric pressure, with a slow stream of nitrogen, through two traps held at −15° C., then into the top of a reaction chamber held at −30° C., where it is taken up as a dispersion in a rapidly agitated mixture of 523 parts of decahydronaphthalene and 5 parts of an oleic acid ester of a polyethylene glycol having a molecular weight of 400. The slurry which forms is stirred at −30° C. for 30 minutes, following completion of the addition of the formaldehyde. The slurry is then filtered to remove the polyoxymethylene which forms. The product is washed with ether, air-dried, and then vacuum-dried. There is obtained 60 parts (87% of theory) of snow-white, granular, polyoxymethylene having an inherent viscosity of 1.66 at 0.5% concentration in p-chlorophenol at 60° C.

Still another method of obtaining high molecular weight formaldehyde polymer is described in copending application Serial No. 365,278, filed by Bechtold et al. on June 30, 1953.

By the process of the present invention, solutions which contain up to 33% or more by weight of polyoxymethylene are readily made, the most useful range of concentration being from about 0.1% to about 20% by weight.

The solvents used in the preparation of the solutions of this invention fall into two broad classes, viz., the phenols and the aralkanols. These compounds have the common features of having an aromatic nucleus and at least one hydroxyl group which may be attached directly to an aromatic carbon or through intervening acyclic carbon atoms. Examples of such solvents are phenol, p-tertiary-butyl phenol, m-cresol, o-chlorophenol, p-chlorophenol, mixtures of tri-chlorophenol with phenol in 7:10 weight ratio, beta-naphthol, methyl p-hydroxybenzoate, 2-bromo-4-tertiary-butylphenol, resorcinol monoethyl ether, benzyl alcohol, tolyl-methyl carbinol, and the like. The preferred solvents are the chlorophenols because they dissolve the polymer at relatively low temperatures.

The solutions of this invention are highly useful in characterizing the polyoxymethylenes.

Solutions of the polyoxymethylenes high in polyoxymethylene content can be diluted either with active solvents for the polyoxymethylene or with small amounts of non-solvent. Addition of large amounts of non-solvents, accompanied by agitation, brings about precipitation of the polyoxymethylene in finely divided form, thus effecting a convenient and practical method for obtaining polymer in such form.

Solubility of the polyoxymethylenes generally increases with the temperature. When a warm concentrated solution is cooled below the saturation point, slow precipitation or gelatin occurs. Such gels find usefulness as coating compositions where it is desired to apply a paste rather than a solution, however true solution properties may be regained by warming the gel.

The solutions of this invention can be modified by incorporation of pigments, dyes, plasticizers for the polyoxymethylenes, resins, waxes, antioxidants, corrosion inhibitors, viscosity stabilizers, acid acceptors such as pinene or phenoxypropylene oxide, metal deactivators, fillers and other desirable additives.

The solutions of this invention are useful for forming a variety of objects. Solidification of the polymer may be produced when the solvent is removed by evaporation. Typical objects which can thus be formed are fibers, filaments, films, tapes, coatings, and plasticized or otherwise modified films. The solutions are also useful for application as lacquers on wood, metal, glass, paper, textile material, coating of wire, or binders for fibrous structures, such as rock wool, glass fibers, and as adhesives.

Films cast from solutions of the polyoxymethylenes are tough and translucent. Where pigments are incorporated into the solutions and dispersed as by grinding or other recognized methods, the products are useful as printing pastes for fabrics or the like.

Filaments can be spun from the solutions either by the dry or wet technique.

We claim:

1. A composition of matter comprising a liquid solution of macromolecular polyoxymethylene in a solvent consisting essentially of an aromatic hydroxy compound, at a temperature above 35° C., said polyoxymethylene having an inherent viscosity of at least 0.6, measured at 60° C. as a 0.5% solution in p-chlorophenol containing 2% alpha-pinene, said solution being characterized in that said polyoxymethylene may be recovered from said solution in substantially the same undegraded polymeric form that it had before being dissolved.

2. The composition of claim 1 in which the aromatic hydroxy compound is a chlorophenol.

3. The composition of claim 1 wherein the aromatic hydroxy compound is benzyl alcohol and the temperature is above 110° C.

4. The composition of claim 1 in which the aromatic hydroxy compound is selected from the class consisting of phenols, aralkanols, and mixtures of phenols and aralkanols.

5. A liquid solution comprising from about 0.1% to about 33% by weight of macromolecular polyoxymethylene dissolved in a solvent consisting essentially of an aromatic hydroxy compound at a temperature above 35° C., said polyoxymethylene having an inherent viscosity of at least 0.6, measured at 60° C. as a 0.5% solution in p-chlorophenol containing 2% alpha-pinene, said solution being characterized in that said polyoxymethylene may be recovered from said solution in substantially the same undegraded polymeric form that it had before being dissolved.

References Cited in the file of this patent

UNITED STATES PATENTS

| | | |
|---|---|---|
| 2,296,249 | Austin et al. | Sept. 22, 1942 |

FOREIGN PATENTS

| | | |
|---|---|---|
| 281,530 | Great Britain | Dec. 8, 1927 |